(No Model.)   H. A. HARVEY.   3 Sheets—Sheet 1.
MANUFACTURING SCREWS AND SCREW BOLTS.

No. 248,168.   Patented Oct. 11, 1881.

(No Model.)

3 Sheets—Sheet 2.

H. A. HARVEY.
MANUFACTURING SCREWS AND SCREW BOLTS.

No. 248,168. Patented Oct. 11, 1881.

Witnesses:
Geo. W. Miatt
M. L. Adams

Inventor
H. A. Harvey
Per Edw. E. Lumby
Atty.

(No Model.)  3 Sheets—Sheet 3.

H. A. HARVEY.
MANUFACTURING SCREWS AND SCREW BOLTS.

No. 248,168. Patented Oct. 11, 1881.

Witnesses:
Geo. W. Miatt
M. L. Adams

Inventor:
H. A. Harvey
Per Edw. E. Quimby
Atty

UNITED STATES PATENT OFFICE.

HAYWARD A. HARVEY, OF ORANGE, NEW JERSEY.

MANUFACTURING SCREWS AND SCREW-BOLTS.

SPECIFICATION forming part of Letters Patent No. 248,168, dated October 11, 1881.

Application filed April 4, 1881. (No model.)

*To all whom it may concern:*

Be it known that I, HAYWARD A. HARVEY, of Orange, New Jersey, have invented certain Improvements in the Method of and Apparatus for Manufacturing Screws and Screw-Bolts with Rolled Threads, of which the following is a specification.

In machines for rolling the threads of screws or screw-bolts wherein the thread is formed by rolling the blank between two dies, the working-faces of which are provided with parallel ribs of relatively-opposite inclinations, the metal dislodged from the cavities of the threads is thrown laterally outward, and the result is that the diameter of the threaded part of the shank is thus increased beyond the diameter of the unthreaded part. In this particular the rolled screw differs from the screws made by cutting the threads, wherein the diameter of the threaded part of the shank is the same as the diameter of the unthreaded part.

It is the object of my invention to make screws with rolled threads of the same diameter as that of the unthreaded part of the shank; and my invention consists in preparing the blank to receive the thread by rolling down that portion of the shank upon which the thread is to be formed until its diameter is so far reduced that in the subsequent rolling operation the threads will be thrown out from its surface to such a distance that the length of the radius of the threaded part will be the same as the length of the radius of the unthreaded part of the shank.

The reduction of the diameter of that portion of the blank which is to be threaded may either be performed in a separate machine, or it may be performed by a pair of dies consisting of a rolling-die and a stationary curved die with smooth working-faces which may be incorporated into a machine containing other pairs of similar dies having their working-faces ribbed for the purpose of forming the threads, as herein illustrated.

Figure 1:
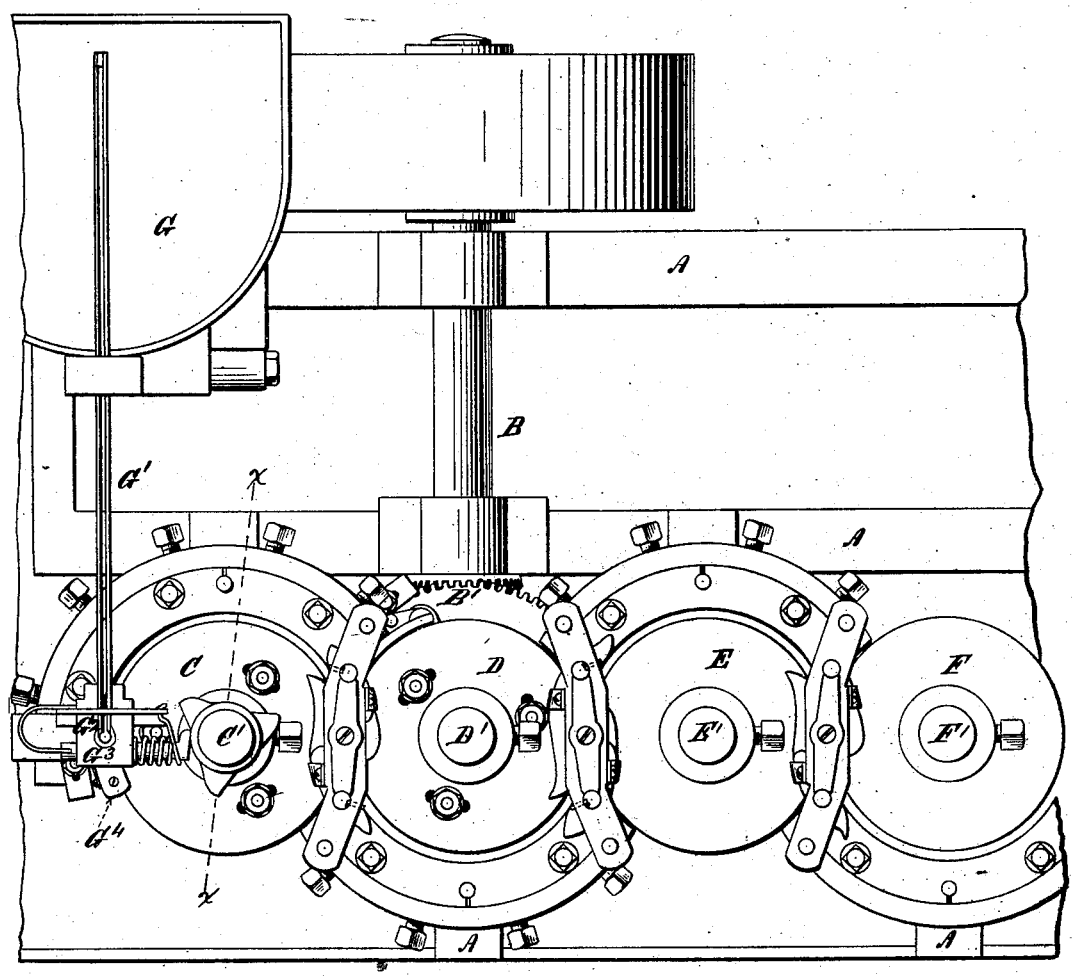
Figure 2:
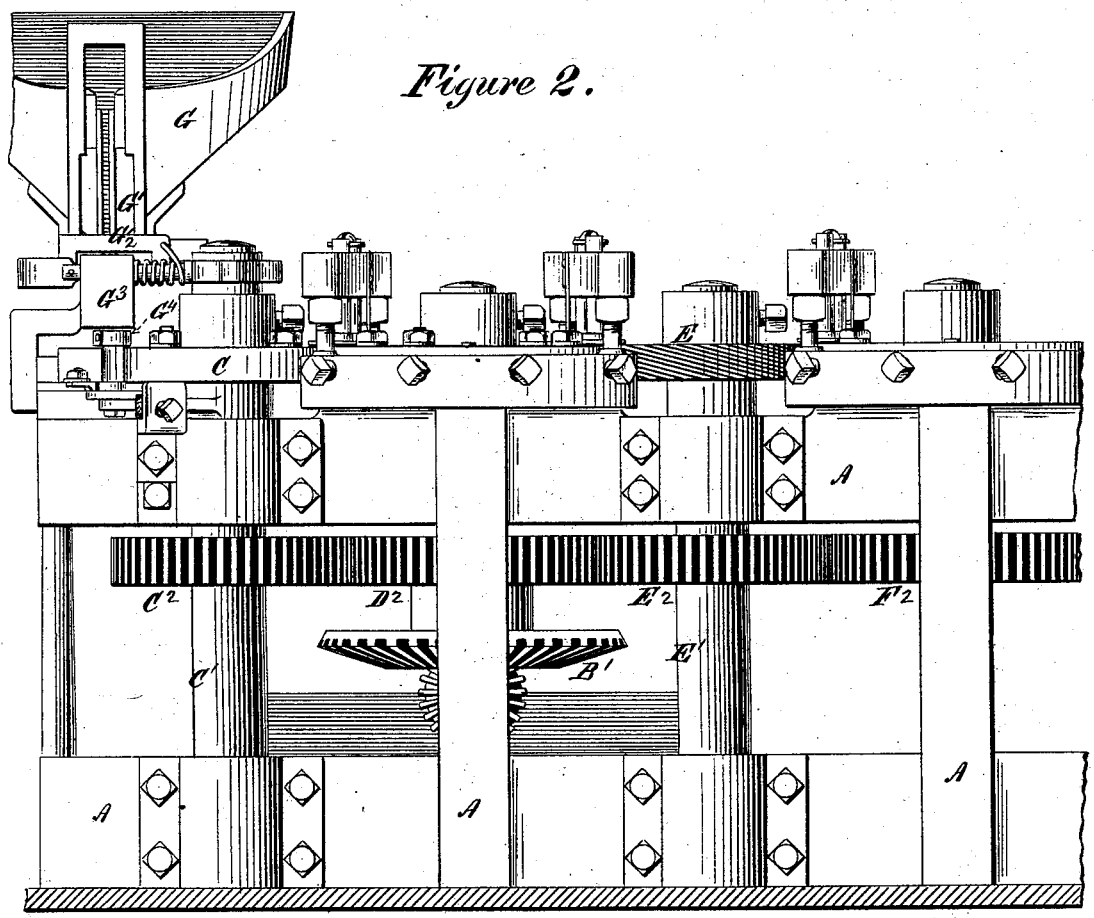
Figure 6:
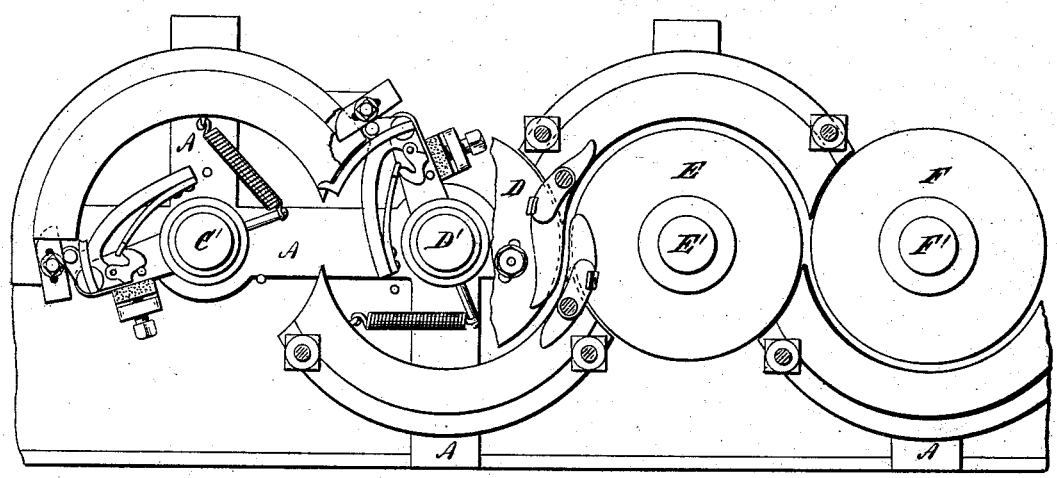
Figure 3:
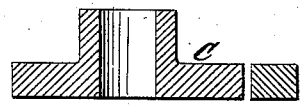
Figure 4:
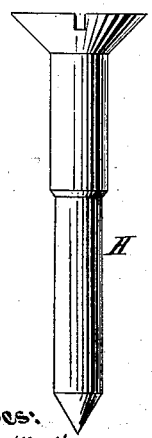
Figure 5:
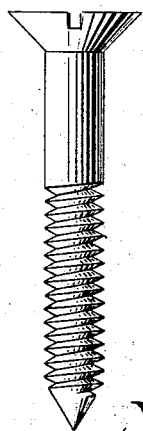

The accompanying drawings are as follows:

Figure 1 is a top view of the machine; Fig. 2, a front elevation. Fig. 3 is a vertical section of the reducing-dies through the line $x\, x$ on Fig. 1. Fig. 4 is an elevation, upon an enlarged scale, of a blank having that portion of the shank upon which the thread is to be formed suitably reduced in diameter. Fig. 5 is a view, upon a similarly-enlarged scale, of the finished screw made by rolling the thread upon the reduced part of the blank shown in Fig. 4. Fig. 6 is a top view of the portion of the machine in which the dies are located, with the reducing-die and a portion of the first rotating threading-die removed in order to exhibit the mechanism employed to operate the pusher which effects the delivery of the blank from the reducing-dies to the first pair of threading-dies.

In the class of machines to which my invention belongs the thread is impressed upon the body of the blank by a series of progressive rolling operations, performed by any desired number of pairs of dies, each pair consisting of a rotating-die and a stationary curved die, the working-faces of which are formed with parallel ribs, the ribs upon the face of one die being inclined in a direction relatively opposite to the inclination of the ribs of the other die.

In the machine a suitable frame, A, supports a horizontal driving-shaft, B.

The several rotating-dies C, D, E, and F of the machine are mounted respectively upon the vertical shafts $C'$, $D'$, $E'$, and $F'$, which are geared together by means of the cog-wheels $C^2$, $D^2$, $E^2$, and $F^2$, so that motion imparted to one of the vertical shafts from the driving-shaft B by means of the bevel-gearing $B'$ is imparted to all the vertical shafts.

The machine is provided with the usual feed mechanism, consisting of the hopper G, inclined ways $G'$, check $G^2$, and tube $G^3$, through which the blanks are successively dropped into the deliverer $G^4$, by the operation of which they are at the proper time successively thrust forward bodily, so that that portion of the body of the blank which it is desired to reduce in diameter is introduced between the face of the rotating reducing-die and the face of the stationary curved reducing-die.

The stationary curved die is provided with the usual facilities for adjustment, and is set in a position slightly eccentric to that of the rotating reducing-die, so that as the body of the blank is rolled across the face of the stationary die by the rotation of the rotating die it is gradually rolled down until it acquires the shape shown in Fig. 4, wherein the portion H of the blank is represented as having been suitably reduced in diameter.

Having passed through the reducing-dies, the blank is at the proper time delivered to the action of the primary threading-dies by a pusher moving in the arc of a circle concentric with the rotating threading-die. By means of adjusting devices this pusher is adapted to deliver the blank to the threading-dies at the instant when the parallel ribs upon the face of the rotating die bisect a vertical radial plane at elevations midway between the points at which the ribs of the stationary curved die bisect the same radial plane.

From the primary threading-dies the blank is transferred to the second pair of threading-dies, which perform the next step in the operation of impressing the spiral thread upon the body of the blank, and so on.

The transferring device consists of spring-guides, between which the blank is suspended by the head, and by which it is held with elastic pressure against the face of the rotating threading-die. Other transferring devices may also be used.

As I have made the adjustable delivering device and the transferring device shown in the drawings the subjects of claim in another pending application, I do not deem it necessary to herein describe them in detail.

It is not essential to the practice of my method of rolling the threads of screws or screw-bolts that the operation of reducing the shank of the blank shall be performed in the same machine as that in which the rolling of the threads is performed. The blanks may have their shanks reduced in diameter in a separate machine employing only reducing-dies, and may then be deposited in a hopper and fed in the ordinary manner to a machine for rolling the threads.

I claim as my invention—

1. The herein-described method of manufacturing screws and screw-bolts with rolled threads of substantially the same diameters as the unthreaded parts of their shanks, which consists in first reducing the diameter of the part of the shank which is to be threaded, and in then rolling up threads upon such reduced part of the shank by means of suitable dies.

2. In a machine for rolling the threads of screws or screw-bolts by a series of progressive operations performed by pairs of dies, each pair consisting of a rotating die and a stationary die, having their opposed faces provided respectively with systems of parallel ribs of relatively opposite inclinations, the combination of such threading-dies with a pair of reducing-dies, consisting of a rotating die and a stationary curved die, having their working-faces smooth, and suitable transferring devices for transferring the blanks successively from the pair of dies by which they are first operated upon to the pair of dies by which they are next operated upon, and so on, substantially as described.

H. A. HARVEY.

Witnesses:
M. L. ADAMS,
ASA FARR.